May 5, 1959 — P. L. CIACCIO — 2,884,796
POWER DRIVE
Filed Aug. 9, 1957 — 2 Sheets-Sheet 1

INVENTOR
PETER L. CIACCIO
BY Lynn H. Latta
ATTORNEY

May 5, 1959     P. L. CIACCIO     2,884,796
POWER DRIVE
Filed Aug. 9, 1957                           2 Sheets-Sheet 2
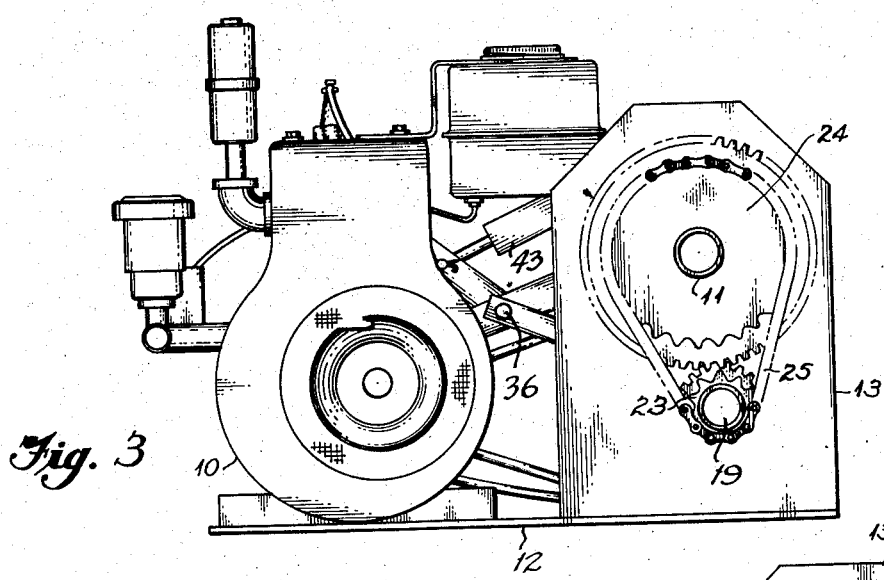
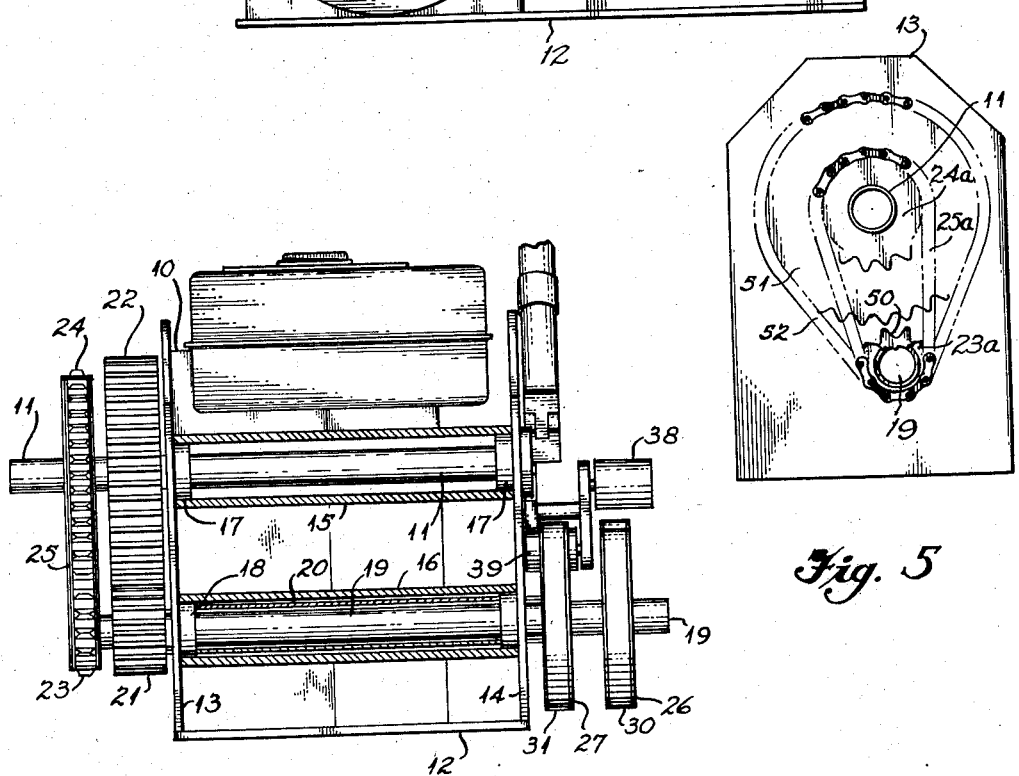
INVENTOR
PETER L. CIACCIO
BY Lynn H. Latta
ATTORNEY United States Patent Office 2,884,796
Patented May 5, 1959

2,884,796

POWER DRIVE

Peter L. Ciaccio, Los Angeles, Calif.

Application August 9, 1957, Serial No. 677,400

8 Claims. (Cl. 74—220)

This invention relates to power drives and has as its object to provide a power drive including a reversing mechanism, of relatively simple and inexpensive construction.

In general, the invention contemplates a power drive mechanism wherein reversing is attained by selective use of either one of two drive belts operating between drive pulleys on the drive motor and the output shaft or arbor of the apparatus respectively.

A further object is to provide a reversible power drive having an overcenter arrangement for locking the drive selecting actuator in at least one of its drive selecting positions.

Other objects will become apparent in the ensuing specifications and appended drawing in which:

Fig. 3 is a side elevational view of the same taken from the opposite side;

Fig. 4 is a transverse vertical sectional view taken at the right end portion of the apparatus as viewed in Fig. 3; and Fig. 5 is a fragmentary side view of a power drive embodying a modified form of the invention.

Figure 1:
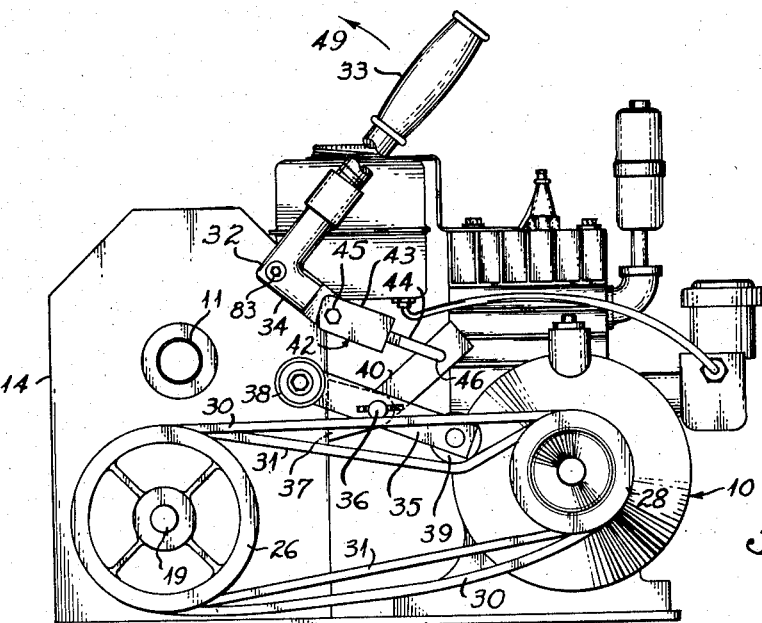
Fig. 1 is a side view of a reversible power drive apparatus embodying the invention.

Referring now to the drawings in detail, I have shown therein, as an example of one form in which the invention may be embodied, a reversible power drive for transmitting drive from a motor 10 to an output shaft 11 arranged in parallel, spaced relation to the motor 10.

A bottom plate 12 provides a means for attaching the apparatus to any selected base. Secured to respective sides of the bottom plate 12 and rising therefrom at one end of the apparatus are a pair of side plates 13 and 14. The plates 13 and 14 are bridged by a pair of tubes 15 and 16 the ends of which are welded to the inner faces of the plates 13 and 14. Mounted within tubes 15 and 16 are bearings 17 and 18 respectively. The output shaft 11 is journalled in the bearings 17. A pair of countershafts 19 and 20 extend through the tube 16, the shaft 20 being a tubular shaft that is journalled in bearings 18 and the shaft 19 being journalled within the shaft 20. At one side of the apparatus, the three shafts, 11, 19 and 20 project beyond the side plate 13, the shaft 11 having a projecting end for attachment of a driven apparatus thereto, the shaft 19 projecting beyond the end of the shaft 20. To the projecting end of shaft 20 is secured a pinion 21 in meshing engagement with spur gear 22 attached to the projecting end of driven shaft 11. To the projecting end of shaft 19 is secured a sprocket 23 which is aligned with a sprocket 24 on driven shaft 11. A drive chain 25 travels over the sprockets 23 and 24, transmitting drive from the former to the latter.

Figure 2:
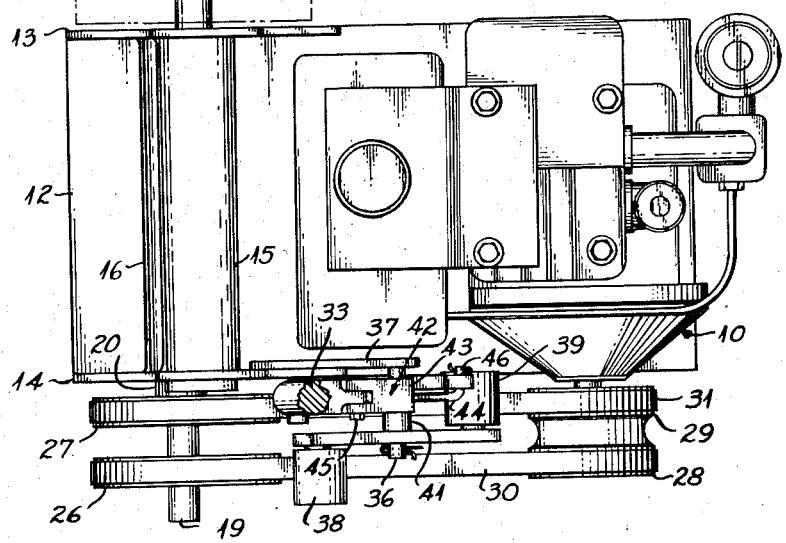
Fig. 2 is a plan view of the apparatus.

At the opposite side of the apparatus, shafts 19 and 20 project beyond side plate 14 with shaft 19 projecting beyond the end of shaft 20. A pulley 26 is secured to the projecting end of shaft 19. A pulley 27, in side by side relation to pulley 26, is secured to the projecting end of shaft 20. Pulleys 28 and 29 (which may be embodied integrally in a double pulley as shown in Fig. 2) are mounted on the shaft of motor 10, in alignment with the pulleys 26 and 27 respectively. A belt 30 travels over the pulleys 26 and 28. A belt 31 travels over the pulleys 27 and 29. Each of these belts is of sufficient length, in relation to the distance between the axes of the motor and the countershaft assembly respectively, so that either belt may be relaxed to non-driving condition.

At this point it will be apparent that, with both belts travelling in the same direction of rotation as received from the common double drive pulley 28, 29, the shafts 19 and 20 will be driven in the same direction of rotation and the pinions 21 and 23 will likewise be rotated in the same direction, but in transmitting drive to the shaft 11, the drive through chain 25 will rotate the shaft 11 in the same direction, while the drive through spur gears 21 and 22 will reverse the drive to the output shaft 11.

Figure 1A:
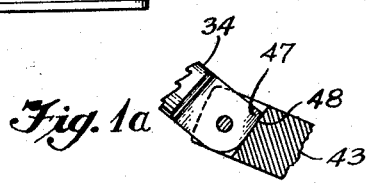
Fig. 1a is a fragmentary detail sectional view of the actuator linkage showing the locked over-center position thereof.

Selection of drive is provided for by an actuator lever 32 of bell crank form, pivoted at its apex on a pivot 83 which is attached to the side plates 14, the lever 32 having a relatively long lever arm extending upwardly and ending in a handle 33, and a relatively short lever arm 34 extending downwardly and toward the motor 10. A belt tightener rocker arm 35 is fastened, by means of a pivot 36 mounted in a bracket 37 projecting from side plate 14, for rocking movement in which rollers 38 and 39 carried by its respective ends are adapted to be alternatively moved into belt tightening engagement with the belt 30 or 31, as desired. A short lever 40 is secured to the rocker arm 35 through a hub 41 (Fig. 2) which is journalled on the pivot pin 36. Lever 40 is inclined upwardly generally parallel to handle 33 and is connected to lever arm 34 by an adjustable link 42 including a clevis section 43 and an L-bar 44, the clevis 43 being connected by a pivot 45 to the end of arm 34 and the L-bar 44 having a trunnion portion 46 which is pivoted in an opening in lever 40. The other leg of L-bar 44 is threaded into clevis 43 for adjustment of the link as to length. Arm 34 and link 42 are inclined in a direction generally transverse to the handle 33 and lever 40, and are adapted to lock in an overcenter position so as to maintain the belt tightened condition of Fig. 1 without the necessity for the operator keeping his grasp on the handle 33. To this end, the arm 34 has at its end a square corner portion 47 which is adapted to engage a shoulder 48 at the base of the slot in the clevis 43 as shown in Fig. 1a, thus determining the locked overcenter position of the linkage.

In the alternative position, in which handle 33 is moved in the direction of arrow 49, the roller 39 is retracted from belt 31 and roller 38 is moved into tightening position against belt 30. This position can be maintained only by the operator maintaining an upward and forward pull against the handle 33.

An intermediate position, in which the handle 33 extends upwardly and slightly forwardly and is supported in that position when released by the operator, will leave both pulleys 38 and 39 riding gently against their respective belts without applying enough pressure to effect transmission of power through the apparatus. This is a de-clutched, non-driving condition.

In the modified form of the invention shown in Fig. 5, the apparatus is adapted to transmit two drives of different speed ratios, both in the same direction. To this end, the spur gears 21 and 22 are replaced by a chain drive including sprockets 50 and 51 and a chain 52 travelling thereover, and the alternative drive is one corresponding generally to the sprocket drive of Fig. 4, including sprockets 23a and 24a and a chain 25a travelling thereover. In other respects, the apparatus may be the same as that shown in Figs. 1–4 and the same reference numerals are applied to the similar parts thereof.

The motor 10 is shown as being in the form of a small two cycle gas engine, although it will be understood that an electric motor can be used instead.

I claim:

1. In a dual drive apparatus, in combination: a motor having a drive shaft; an output shaft; a pair of countershafts including a tubular first shaft and a second shaft extending through said first shaft, journalled therein and projecting from both ends thereof; a pair of adjacent pulleys on said drive shaft; adjacent pulleys on said countershafts, one secured to said first shaft and the other secured to said second shaft, in alignment with the respective pulleys of said drive shaft; belts connecting the pulleys of said drive shaft to the respective pulleys of said countershafts; belt tightener means for selectively tightening one of said belts while releasing the other, each belt when released being in slack, non-driving condition, and when tightened constituting a driving connection between said drive shaft and a respective countershaft, and a pair of driving means for transmitting respective drives of different character from the respective countershafts to said output shaft, in accordance with the operation of said belt tightening means.

2. A dual drive apparatus as defined in claim 1, wherein said pair of driving means are of forward and reverse drive character respectively, for driving said output shaft in forward and reverse directions respectively.

3. A dual drive apparatus as defined in claim 2, wherein said pair of driving means consist in a train of spur gears and a chain and sprocket drive respectively.

4. A dual drive apparatus as defined in claim 1, wherein said pair of driving means are of different drive ratios.

5. A dual drive apparatus as defined in claim 1, wherein said countershafts and said output shaft are arranged at substantially equal distances from said drive shaft.

6. A dual drive apparatus as defined in claim 1, wherein said countershafts and said output shaft are arranged at substantially equal distance from said drive shaft and closer to one another than to said drive shaft.

7. In a dual drive apparatus, in combination: a motor having a drive shaft; an output shaft; a pair of countershafts including a tubular first shaft and a second shaft extending through said first shaft, journalled therein and projecting from both ends thereof; a pair of adjacent pulleys on said drive shaft; adjacent pulleys on said countershafts, one secured to said first shaft and the other secured to said second shaft, in alignment with the respective pulleys of said drive shaft; belts connecting the pulleys of said drive shaft to the respective pulleys of said countershafts; belt tightener means for selectively tightening one of said belts while releasing the other, each belt when released being in slack, non-driving condition, and when tightened constituting a driving connection between said drive shaft and a respective countershaft, and a pair of driving means adjacent to one another on the opposite side of said drive apparatus from said drive pulleys and belts, for transmitting respective drives of different character from the respective countershafts to said output shaft, in accordance with the operation of said belt tightening means.

8. In a dual drive apparatus, in combination: a motor having a drive shaft; an output shaft; a pair of countershafts including a tubular first shaft and a second shaft extending through said first shaft and journalled therein; a pair of pulleys on said drive shaft; pulleys on said countershafts, one secured to said first shaft and the other secured to said second shaft, in alignment with the respective pulleys of said drive shaft; belts connecting the pulleys of said drive shaft to the respective pulleys of said countershafts; belt tightener means for selectively tightening one of said belts while releasing the other, each belt when released being in slack, non-driving condition, and when tightened constituting a driving connection between said drive shaft and a respective countershaft, and a pair of driving means for transmitting respective drives of different character from the respective countershafts to said output shaft, in accordance with the operation of said belt tightening means.

References Cited in the file of this patent

UNITED STATES PATENTS

| | | |
|---|---|---|
| 2,077,663 | Batten | Apr. 20, 1937 |
| 2,516,821 | Wright | July 25, 1950 |
| 2,585,114 | Gredell | Feb. 12, 1952 |
| 2,764,041 | Walker et al. | Sept. 25, 1956 |